(12) United States Patent
Fowler et al.

(10) Patent No.: US 6,493,436 B1
(45) Date of Patent: Dec. 10, 2002

(54) SYSTEM FOR CORRECTING FAILURES OF MUSIC ON TRANSFER

(75) Inventors: Ronald A. Fowler, Westford, MA (US); Karen J. Taylor, Danvers, MA (US); Michael S. McCormack, Gloucester, MA (US)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/782,249

(22) Filed: Feb. 13, 2001

(51) Int. Cl.[7] .............................................. H04M 11/00
(52) U.S. Cl. ................. 379/101.01; 379/76; 379/88.22; 379/162; 379/198
(58) Field of Search ......................... 379/101.01, 90.01, 379/110.01, 162, 163, 166, 266, 269, 393, 88.23, 93.13, 198, 76, 88.22; 381/81, 123, 85, 107, 110

(56) References Cited

FOREIGN PATENT DOCUMENTS

| EP | 000411528 A1 | * | 2/1991 | ............ H04M/1/00 |
| GB | 2 256 346 A | * | 12/1992 | ............ H04H/1/00 |

* cited by examiner

Primary Examiner—Melur Ramakrishnaiah
(74) Attorney, Agent, or Firm—McGlew and Tuttle, P.C.

(57) ABSTRACT

A plurality of audio sources are provided in a Private Branch Exchange (PBX) and monitored to determine if audio is available from any of the sources. Once an audio source with an audio presence has been found, that audio source is connected to the PBX and the PBX uses the audio from that source to provide audio-on-hold to the telephone users at that PBX. The audio coming from that audio source is substantially continuously monitored. When it is determined that this particular audio source is no longer providing audio, this particular audio source is disconnected from the PBX network and another audio source having an audio presence, is connected instead.

19 Claims, 3 Drawing Sheets

SYSTEM FOR CORRECTING FAILURES OF MUSIC ON TRANSFER

FIELD OF THE INVENTION

The present invention relates in general to telephone systems, and in particular to telephone systems providing music or audio-on-hold or -on-transfer to users of the telephone system.

BACKGROUND OF THE INVENTION

It is often desirable during the operation of a telephone system for one or more users to be temporarily blocked from communicating with other users of the telephone system. This blocking occurs during a transfer of a user or when a user is put on hold. The blocked user is therefore disconnected from the other users of the telephone system and has nobody to speak or listen to. Many telephone systems provide audio to blocked users in order to entertain those users. For ease in understanding the present invention, blocked users will be considered to be "on hold" regardless of the specific reason they are blocked. Likewise audio on hold or music on hold is audio supplied to any blocked users regardless of why the user is blocked.

This audio-on-hold feature has become very popular and desirable. Many organizations use this opportunity to inform users on hold about the services and products provided by the organization. Other organizations provide audio from a local radio station or prerecorded music.

The audio-on-hold feature has become so popular, that practically all private telephone systems or Private Branch Exchanges (PBX) provide an audio or music on hold option. The audio-on-hold feature has become so popular, that when telephone users are connected to a PBX, the users put on hold expect to be entertained with audio when they are put on hold. This is especially true when a user has experienced audio-on-hold during a previous call to a particular PBX.

A disadvantage arises when audio is not provided. When a telephone user does not hear audio-on-hold, the telephone user is uncertain as to whether he or she has been placed on hold, or has been disconnected. Being placed on hold without any additional audio, and being disconnected, sound substantially similar, especially to the general public. A typical person is therefore uncertain as to whether they have been place on hold or have been disconnected.

Audio-on-hold can be discontinued for many different reasons. It could be an equipment failure from the PBX, such as the cable between the audio source and the PBX being disconnected or severed, the local radio station providing the audio having an equipment failure and no longer broadcasting, or the device playing back prerecorded audio could fail. Often the users and operators of the PBX are unaware that the audio-on-hold has failed, especially when the users feel they have been disconnected when they are put on hold. Many businesses use PBX systems to communicate between their employees and their customers. When a lack of audio-on-hold causes the customers to believe they have been disconnected, the company's reputation is harmed.

SUMMARY AND OBJECTS OF THE INVENTION

It is the primary object of the present invention to avoid a lack of audio-on-hold in a PBX. This object is accomplished by the present invention monitoring a plurality of audio sources to determine if audio is available from any of the sources. Once an audio source with an audio presence has been found, the present invention connects that audio source to the PBX and uses the audio from that source to provide audio-on-hold to the telephone users at that PBX. The audio coming from that audio source is substantially continuously monitored. When it is determined that this particular audio source is no longer providing audio, this particular audio source is disconnected from the PBX network and another audio source having an audio presence, is connected instead.

It is another object of the present invention to prioritize the available audio sources with the more desirable sources having a higher priority. When a PBX is initialized, the audio sources are prioritized. The audio source with the highest priority is then monitored to determine if it has an audio presence or an audio deficiency. If this selected audio source has an audio presence, then this selected audio source is connected to the PBX to provide audio for the audio-on-hold feature. If this selected audio source has an audio deficiency, the audio source with the next highest priority is selected and monitored to determine if it has an audio presence or deficiency. If this selected audio source has an audio presence, it is connected to the PBX. If it has an audio deficiency, the process is continued until an audio source with an audio presence has been determined, or there are no more audio sources available. If no more audio sources are available, all of the audio sources are monitored again from the beginning. In this way, a PBX is less likely to fail to provide audio-on-hold, especially due to a failure of an audio source.

When an audio source is being used which is less than the highest priority audio source, the higher priority audio sources are still substantially continuously monitored to determine if an audio presence has returned to these higher priority audio sources. Once audio has returned to one of these higher priority sources, the highest of these other sources is then connected to the PBX and provides the audio for audio-on-hold. In this way, informational or promotional audio is available whenever possible to users of the PBX. Also, a less expensive audio source can be provided for the lower priority audio sources since they will hopefully not be used often. The prioritizing of the audio sources therefore provides for the less likelihood of audio-on-hold failure, and does not require the expense of a completely redundant audio source.

The audio from the audio sources can either be generated internally in the PBX, or externally and received through a jack in a PBX audio-on-hold module. If the audio is generated internally, the PBX module can incorporate a player for prerecorded programs, or could include circuitry for synthesizing music. The audio provided, especially for lower priority audio sources, could be synthesized music or telephony type tones such as a ring tone, a busy signal or other similar type tones. Another possible source for audio could be Internet radio, since the PBX system of the present invention could be incorporated into a computer network, and connected to the Internet.

An audio presence or audio deficiency could be determined by measuring the audio activity of a source, either through measuring volume or the root mean square (RMS) of the energy provided by the audio source.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
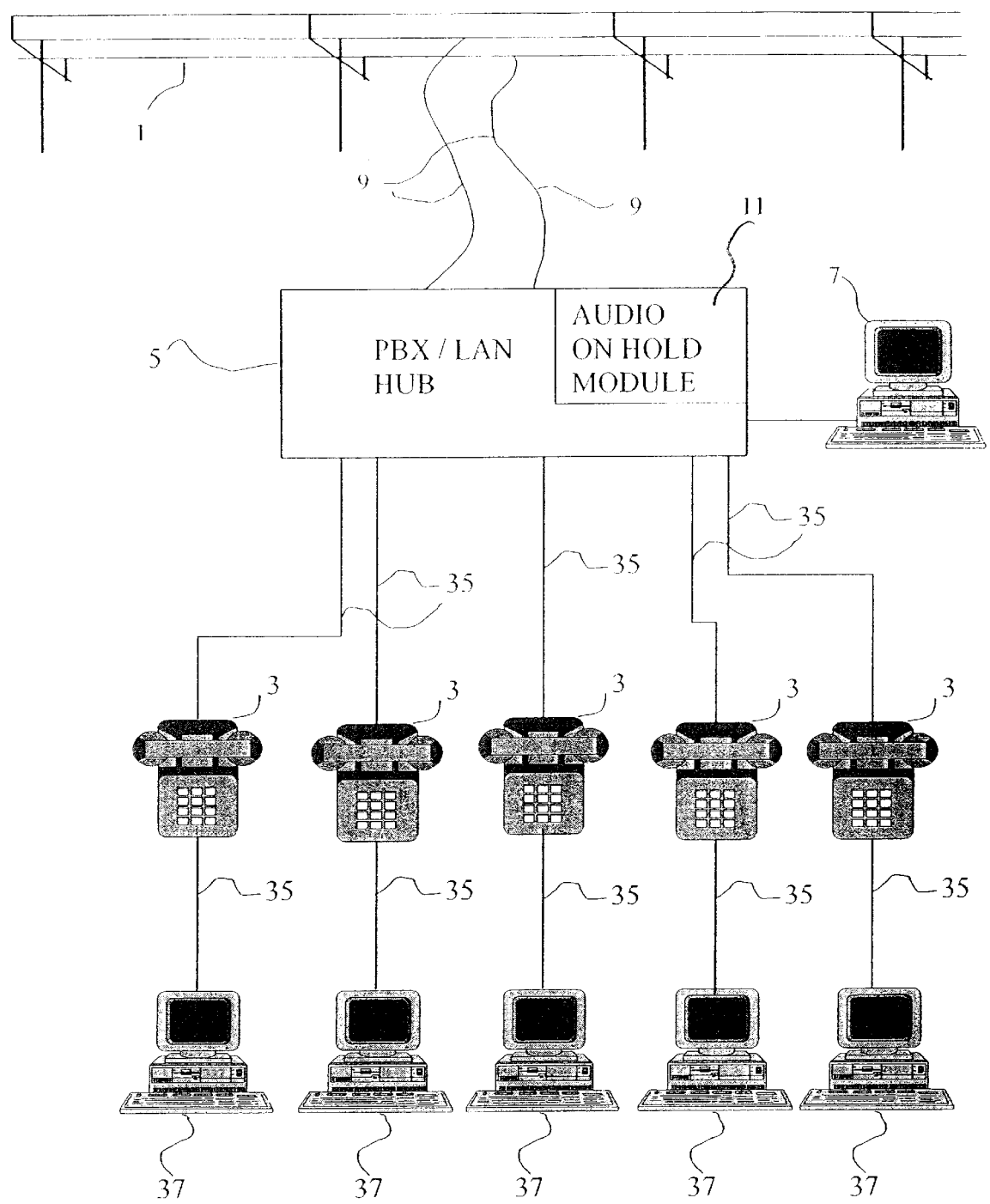
FIG. 1 is a schematic diagram of a telephone system, in particular a PBX in combination with a computer local area network (LAN)

Referring to the drawings, and in particular to FIG. 1, an external telephone complex 1 such as a Public Switched Telephone Network (PSTN) is connected to a PBX/LAN hub 5 by a plurality of outside telephone lines 9. The hub 5 connects a plurality of phones 3 via internal lines 35 and controls how the individual phones 3 communicate with the external telephone complex 1, and how the individual phones 3 communicate between each other. A system workstation 7 allows an operator to program the hub 5 and monitor the status of the PBX system.

The present invention is also very beneficial in a telephone system and computer network combination as shown by the workstations 37 in FIG. 1. In such a system, the local telephones 3 share the same wires 35 with the local workstations 37. This combination of a telephone system and a computer network is described in U.S. patent application Ser. No. 09/203,542 and is hereby incorporated by reference.

Figure 2:
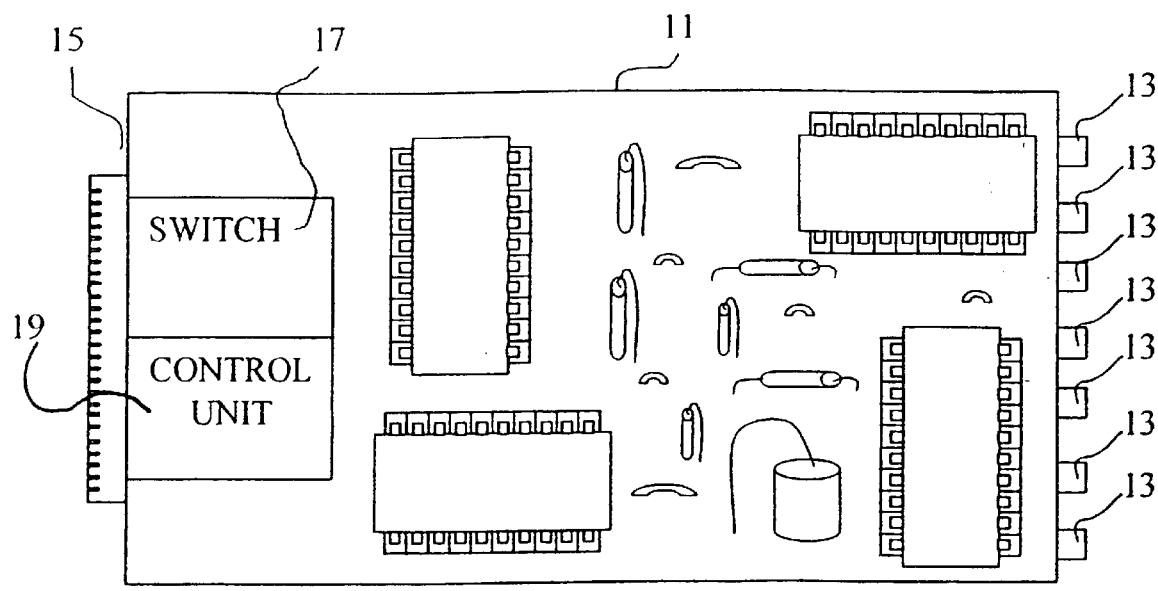
FIG. 2 is a view of a PBX audio-on-hold module.

In the preferred embodiment of the present invention, an audio-on-hold module 11 is included in the hub 5. This audio-on-hold module does not necessarily need to be incorporated into the hub 5, but instead can be incorporated into the system workstation 7, the individual workstations 37, or even one of the individual phones in 3. As shown in FIG. 2, the audio-on-hold module 11 includes a plurality of audio inputs 13 and a PBX connector 15. The audio inputs 13 shown in FIG. 2 are for connecting to external audio sources. Circuitry inside audio-on-hold module 11 can generate the audio internally and supply this internal audio to internal audio inputs which are not shown. Additional circuitry inside audio-on-hold module 11 provides for an audio sensor which senses each of the audio inputs and detects whether there is an audio presence or an audio deficiency at each of the audio inputs. A switch 17 is included in the audio-on-hold module for selectively connecting one of the plurality of audio inputs to the PBX connector 15. A control unit 19 monitors the circuitry forming the audio sensor and controls the switch 17 to maintain the PBX connector 15 connected to one of the audio inputs having an audio presence.

The circuitry for the audio sensor, can detect audio presence or deficiency through many different methods. In the preferred embodiment, each of the audio inputs is monitored for activity, either with regard to energy or volume. If energy is used as the detectable feature, the root mean square (RMS) is performed on the energy present and then RMS above a threshold is considered to indicate a presence of audio.

One audio sensor can be provided for each audio source or audio input, or a single audio sensor can be provided which then sequentially monitors all of the audio sources or audio inputs at a rate high enough to be substantially constant for the purposes of providing audio-on-hold to the telephone users to convince the users on hold that they have not been disconnected. The switch 17 and control unit 19 of the present invention can be incorporated into the audio sensor in order to reduce costs.

Figure 3:
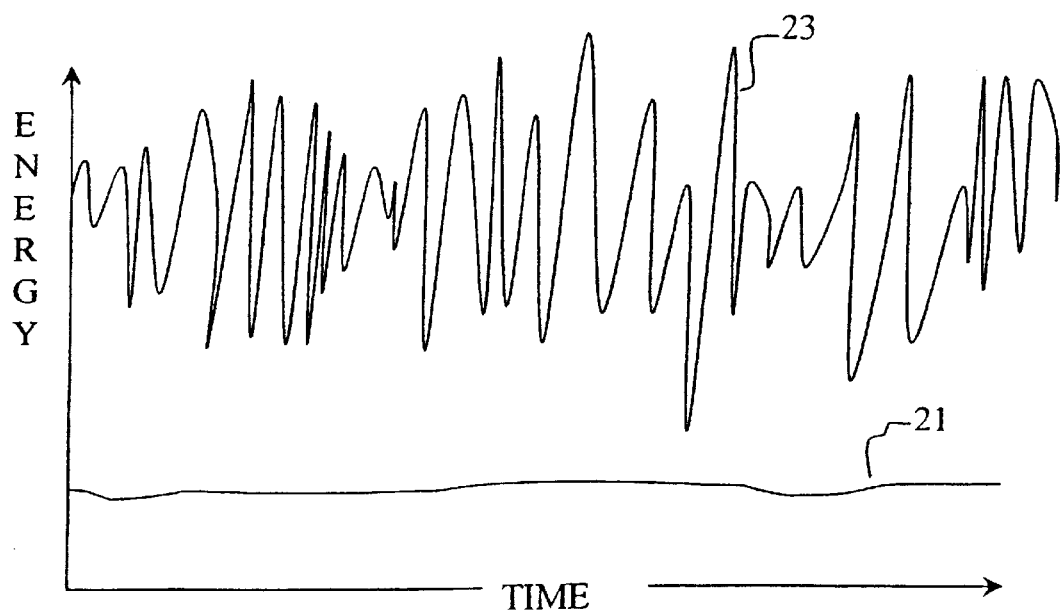
FIG. 3 is a graph of audio activity.

FIG. 3 shows a graph of an audio source versus time. Energy activity corresponding to signal 21 is considered to represent an audio source having an audio deficiency. An audio source having an energy signal 23 is considered to have an audio presence. Circuitry for providing the individual functions of the audio-on-hold module 11, such as the audio inputs, the switch, the control unit, the audio sensor, and any structure for generating audio internally, is known to a person of ordinary skill, and therefore no further description is necessary or warranted.

Figure 4:
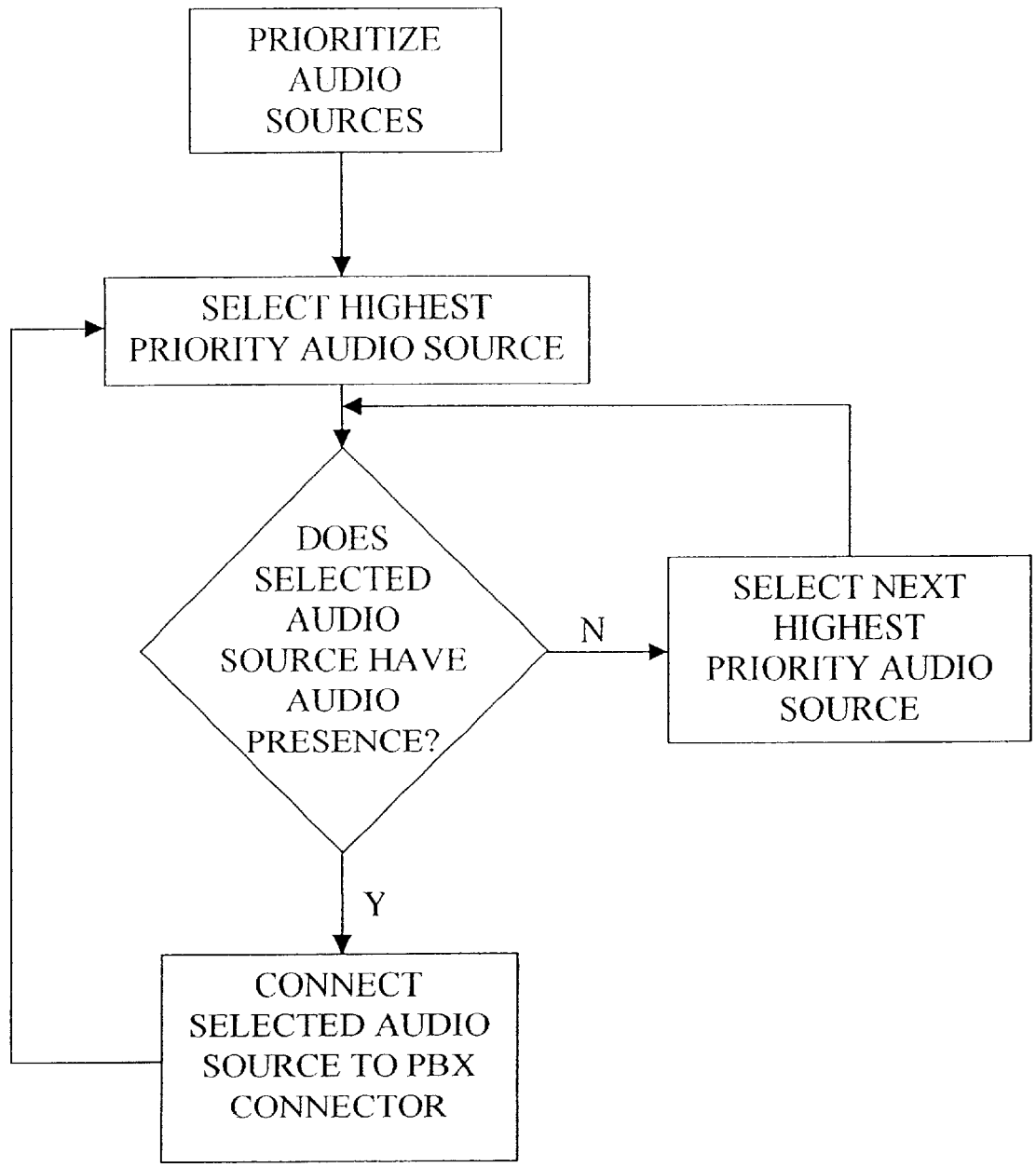
FIG. 4 is a flow chart of the method of the present invention.

When the telephone system incorporating the present invention is installed, audio sources are provided and are connected to the audio-on-hold module. As shown in FIG. 4, it is preferable to prioritize the audio sources in a connection order, as to which sources are more desirable to be provided for audio-on-hold in the PBX. After the audio sources are prioritized, the highest priority audio source is selected and monitored to determine if the selected audio source has an audio presence. If the audio source has an audio presence, the selected audio source is connected to the PBX connector to provide the audio for the audio-on-hold. This audio source is substantially continuously monitored to determine if audio is present. If at any time, audio is not present, the next highest priority audio source is selected and monitored for an audio presence. If this audio source has an audio presence, it is then connected to the PBX connector to supply audio for the audio-on-hold of the PBX system. This process is continued repetitively until an audio source is found having an audio presence, and that audio source is connected to the PBX connector.

When the audio source includes a plurality of music files, there is often a delay or pause between music files, such as between the songs on a CD. When monitoring an audio source for an audio presence or deficiency, it is therefore desirable to take into account silent periods or pauses that may naturally occur in an audio source. In a preferred embodiment of the present invention, an audio presence can be confirmed with less than a second of detected audio activity from an audio source. Conversely, an audio deficiency is preferably only confirmed after several tens of seconds of no detected audio activity. This avoids the problem of a pause between songs, a pause during a rewinding of a tape, or a natural pause during an audio presentation, from causing a switch to another less important audio source.

In a still preferred embodiment, all of the audio sources having a higher priority than the selected audio source are also monitored. If any of these higher priority audio sources have an audio presence, the highest of those audio sources is then connected to the PBX connector. This insures that the most desirable audio sources are always connected to the PBX whenever possible.

While specific embodiments of the invention have been shown and described in detail to illustrate the application of the principles of the invention, it will be understood that the invention may be embodied otherwise without departing from such principles.

What is claimed is:

1. A method for providing audio-on-hold in a telephone system, the method comprising:

monitoring a plurality of audio sources for one of an audio presence and an audio deficiency at one of said audio sources;

selectively prioritizing the audio sources;

connecting one of the audio sources having an audio presence and a highest priority to the telephone system to provide audio-on-hold to users of the telephone system;

detecting when the one audio source has an audio deficiency;

connecting another of the audio sources having an audio presence when the one audio source has an audio deficiency.

2. A method in accordance with claim 1, further comprising:

reconnecting the one audio source to the telephone system when the one audio source regains an audio presence.

3. A method in accordance with claim 1, wherein:

said connecting substantially continuously connects a highest priority audio source with an audio presence to the telephone system.

4. A method in accordance with claim 1, further comprising:

generating audio for one of the audio sources internally in the telephone systems.

5. A method in accordance with claim 4, further comprising:

receiving audio from another one of the audio sources externally of the telephone system.

6. A method in accordance with claim 4, wherein:

said generating of the audio includes playing one of synthesized music, tones, and prerecorded audio stored in the telephone system.

7. A method in accordance with claim 1, wherein:

said monitoring and said detecting of the audio presence is performed by measuring one of volume and energy received by from the audio sources.

8. A method in accordance with claim 1, wherein:

said connecting of the audio sources includes receiving audio from an audio source external to the telephone system.

9. A method in accordance with claim 1, wherein:

said connecting of the audio sources includes receiving audio from two audio sources external to the telephone system.

10. A method in accordance with claim 1, wherein:

said connecting is performed by a PBX audio-on-hold module having a plurality of audio inputs and a PBX connector for connecting to a PBX network and providing the audio-on-hold to individual users connected to the telephone system.

11. A method in accordance with claim 1, wherein:

said monitoring, detecting and connecting is performed by a PBX audio-on-hold module having a plurality of audio inputs and a PBX connector for connecting to a PBX network and providing the audio-on-hold to individual users connected to the telephone system.

12. A telephone system comprising:

a PBX audio-on-hold module having a plurality of audio inputs for receiving audio-on-hold from a plurality of different sources, said PBX audio-on-hold module having a PBX connector for connecting to a PBX network and providing the audio-on-hold to individual users connected to the telephone system;

an audio sensor for each of said audio inputs and for detecting one of an audio presence and an audio deficiency at said each audio input;

a switch in said audio-on-hold module for selectively connecting one of said plurality of audio inputs to said PBX connector;

a control unit monitoring said audio sensor and controlling said switch to maintain said PBX connector connected to one of said audio inputs having an audio presence, said control unit selectively prioritizing said audio inputs and connecting said audio inputs based on priority.

13. A telephone system in accordance with claim 12, wherein:

said control unit controls said switch to connect another of said audio inputs having an audio presence to the PBX connector when a previously connected said audio input has an audio deficiency.

14. A system in accordance with claim 13, wherein:

said control unit reconnects said previously connected audio input to the telephone system when said previously connected audio input regains an audio presence.

15. A system in accordance with claim 12, wherein:

said control unit substantially continuously connects a highest priority of said audio inputs with an audio presence to the telephone system.

16. A system in accordance with claim 12, wherein:

said audio-on-hold module generates audio for one of said audio inputs internally in the telephone systems;

another of said audio inputs receives audio externally of the telephone systems.

17. A system in accordance with claim 12, further comprising:

a PBX/LAN hub;

a plurality of telephones connected to said PBX/LAN hub;

a plurality of workstations connected together to form a computer network, said plurality of workstations and said plurality of telephones communicating with each other over common lines;

said audio-on-hold module being arranged in one of said plurality of telephones and said plurality of workstations, said telephones and said workstations communicating with each other and with said PBX/LAN hub via data packets;

said audio-on-hold module sending audio to said telephones via data packetes.

18. A telephone system comprising:

a PBX/LAN hub;

a plurality of telephones connected to said PBX/LAN hub;

a plurality of workstations connected together to form a computer network, said plurality of workstations and said plurality of telephones communicating with each other over common lines;

an audio-on-hold module arranged in one of said plurality of telephones and said plurality of workstations, said audio-on-hold module having a plurality of audio inputs for receiving audio-on-hold from a plurality of different sources, audio-on-hold module providing the audio-on-hold to individual users connected to the telephone system, wherein said audio-on-hold system includes an audio sensor for each of said audio inputs and for detecting one of an audio presence and audio deficiency at said each audio input; said audio-on-hold module includes a switch selectively connecting one of said plurality of audio inputs to said telephones; a control unit monitors said audio sensor and controls said switch to maintain said telephones connected to one of said audio inputs having audio presence, said control unit selectively prioritizing said audio inputs and connecting said audio inputs based on priority.

19. A system in accordance with claim 18, further comprising:

a workstation connected to said PBX/LAN hub for configuring said PBX/LAN hub, said audio-on-hold module being arranged in said workstation.

* * * * *